No. 813,435. PATENTED FEB. 27, 1906.
S. B. KIMBER.
CARTRIDGE LOADING MACHINE.
APPLICATION FILED OCT. 15, 1904.

WITNESSES:
Henry Druny
M. M. Hamilton

INVENTOR
Simeon B. Kimber
BY
Harding & Harding
ATTORNEYS

No. 813,435. PATENTED FEB. 27, 1906.
S. B. KIMBER.
CARTRIDGE LOADING MACHINE.
APPLICATION FILED OCT. 15, 1904.

WITNESSES:

INVENTOR
Simeon B. Kimber
BY
Harding & Harding
ATTORNEYS

No. 813,435. PATENTED FEB. 27, 1906.
S. B. KIMBER.
CARTRIDGE LOADING MACHINE.
APPLICATION FILED OCT. 15, 1904.

WITNESSES:

INVENTOR
Simeon B. Kimber
BY
Harding & Harding
ATTORNEYS

No. 813,435. PATENTED FEB. 27, 1906.
S. B. KIMBER.
CARTRIDGE LOADING MACHINE.
APPLICATION FILED OCT. 15, 1904.

WITNESSES:
Henry Drury
M. M. Hamilton

INVENTOR
Simeon B. Kimber
BY
Harding & Harding
ATTORNEYS

No. 813,435. PATENTED FEB. 27, 1906.
S. B. KIMBER.
CARTRIDGE LOADING MACHINE.
APPLICATION FILED OCT. 15, 1904.

WITNESSES:

INVENTOR
Simeon B. Kimber
BY
Harding & Harding
ATTORNEYS

UNITED STATES PATENT OFFICE.

SIMEON BURRITT KIMBER, OF MARQUETTE, MICHIGAN, ASSIGNOR TO THE E. I. DU PONT DE NEMOURS POWDER COMPANY, OF WILMINGTON, DELAWARE, A CORPORATION OF NEW JERSEY.

CARTRIDGE-LOADING MACHINE.

No. 813,435.     Specification of Letters Patent.     Patented Feb. 27, 1906.

Application filed October 15, 1904. Serial No. 228,554.

*To all whom it may concern:*

Be it known that I, SIMEON BURRITT KIMBER, a citizen of the United States, residing at Marquette, county of Marquette, and State of Michigan, have invented a new and useful Improvement in Cartridge-Loading Machines, of which the following is a full, clear, and exact description, reference being had to the accompanying drawings, which form a part of this specification.

My invention relates to machines for packing or loading shells or cartridges.

The objects of the invention are to pack all of the shells with a uniform pressure; to enable such pressure to be adjusted; to enable a plurality of shells to be simultaneously packed by independently-operated tamps; to lock each tamp from moving on any stroke in front of the position to which it has been forced by the explosive packed by it on the previous stroke; to automatically lock each tamp independently after it has completed the packing of a shell; to simultaneously throw into action all the tamps and restore the parts to their initial position after one set of shells is loaded and a new set placed in position for loading, and generally to perfect the operation of the machine.

The invention consists of the means for effecting the above-named objects and of certain general and specific details of construction, all as fully hereinafter described, and particularly claimed.

In the drawings, Figures 1 and 1ª represent a side elevation of the machine, partially in section; Fig. 7, a rear end view of some of the roller-cases, showing also the plunger-rod-locking latches and their spring-actuated catches.

$a$ is the frame, having the inclined beams $a'$.

Figure 6:
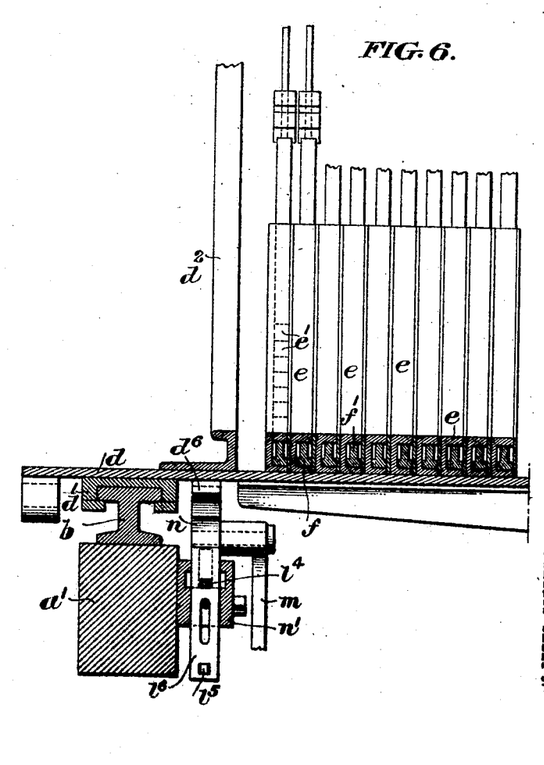
Fig. 6, a section on the line 6 6 of Fig. 3.

$b\ b$ are rails forming the track for the reciprocating parts, said rails being of I-section and secured to the inclined beams. (See Fig. 6.)

$d$ is a plunger cross-head or carriage, said carriage having a shoe $d'$ at each side embracing the top flange of the corresponding rail $b$, the carriage being thereby slidable back and forth on the rails.

$e\ e$ are roller-cases bolted on the carriage $d$, each roller-case having a vertical wing and a wing somewhat inclined to the horizontal and provided with a channel extending through its length for the reception of rollers $e'$. The section of the channel connecting its vertical and inclined portions is curved to permit the rollers to slide freely therein.

$d^2\ d^2$ are brackets bolted on the carriage $d$. On top of the brackets is bolted a cross-piece $d^3$, slotted to form guides for the vertical presser-rods $e^2$. These presser-rods carry weights $e^3$ and extend down within the upright wing of the roller-channels and bear upon the rollers $e'$.

$d^4$ is a strip connecting the brackets $d^2\ d^2$ and having holes to receive the teats $e^4$ on the backs of the roller-cases.

$f\ f$, &c., are plunger-rods which extend through orifices extending longitudinally through the inclined wings of the roller-cases $e$ and are provided with riders $f''$, which extend within the inclined portions of the roller-channels and take the thrust communicated by the rollers. The forward ends of the plunger-rods $f$ are pinned to flexible rods $f^2$, (preferably of wood,) which are jointed at their forward ends by means of the guide-blocks $f^3$ with the tamps $f^4$.

Figure 8:
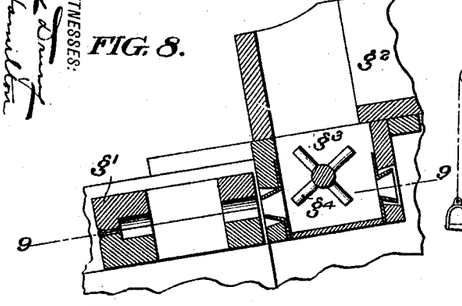
Fig. 8, an enlarged sectional elevation of the shuttle and explosive receptacle.
Figure 9:
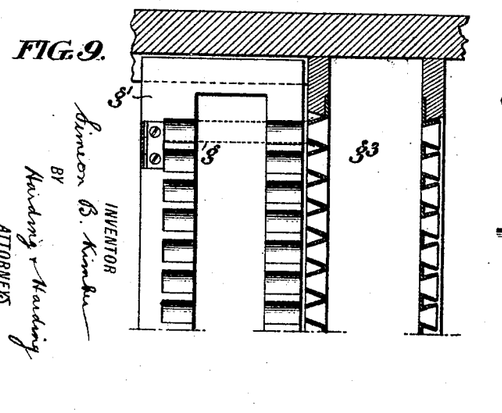
Fig. 9, a section on the line 9 9 of Fig. 9.
Figure 10:
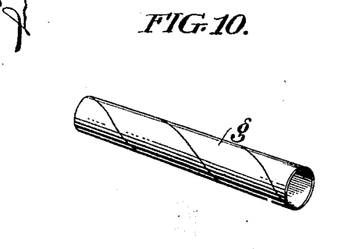
Fig. 10, a perspective view of an unloaded shell, and Fig. 11 a similar view of a loaded shell.
Figure 11:
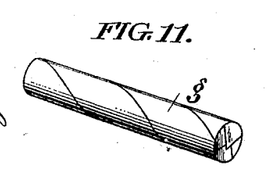

The shells $g$ (see Fig. 10) are held in a wooden shuttle $g'$ (see Figs. 8 and 9) and in alinement with the tamps, and the dynamite or other explosive is fed from an inclined pan $g^2$ into a receptacle $g^3$, into and through which the tamps are adapted to pass, the front and rear walls of this receptacle having longitudinal orifices and the tamps $f^4$ sliding in guides $f^7$, supported along these orifices. A stirrer $g^4$ rotates within the receptacle, forcing the explosive in front of the tamps as they are drawn back.

$c$ is the main driving-shaft. $c'$ is a pulley thereon, belted to a pulley $c^3$ on the shaft $c^2$. The shaft $c^2$ has keyed to it disks $c^4\ c^4$, which are connected to the carriage $d$ by means of connecting-rods $c^5\ c^5$. Rotation of the shaft $c$ thus imparts a constant reciprocating movement to the carriage $d$ and the roller-cases carried thereby. The weights $e^3$, carried on the pressure-rods $e^2$, impose a certain pressure on the rollers $e'$, which pressure is communicated to the plungers $f$. As the tamps press the explosive into the shells this pressure is imparted to the explosive, thus insuring that all the shells shall be packed with a uniform pressure. Each set of roller-cases, plunger-rods, tamps, &c., is entirely independent of the other sets, except so far as they are operated in unison by the carriage. As the explosive may not be distributed with absolute uniformity throughout the receptacle $g^3$, there may be some variation in the amount of the explosive packed in the several shells at the end of each forward stroke of the carriage $d$. Each tamp and its corresponding plunger-rod will therefore be forced back a distance corresponding to the amount of the explosive taken in, forcing up the rollers and weighted presser-rods correspondingly. Each tamp and plunger is held in this new position relative to its roller-case by the following means: Each plunger-rod $f$ is provided with a grooved or ratcheted upper face. $o$ is a latch or lock, pivoted between its ends to the roller-carriage. As the plunger-rod is retracted the latch drops into a groove on the plunger-rod, holding it from moving forwardly relatively to its corresponding roller-case and locking each tamp from moving on any stroke in front of the position to which it has been forced by the explosive packed by it on the previous stroke. Thus the plunger-rod is caught farther back at each stroke until the shell is completely filled. When any shell is thus filled, the hooked end $f^5$ of the corresponding plunger-rod is forced over the lip $k'$ of a transversely-extending dogging-bar or lock $k$, L-shaped in cross-section, (supported as hereinafter described,) and is held stationary while the carriage continues its motion independently until all the shells are filled and all the plunger-rods are engaged by the dogging-bar $k$. As the carriage is drawn back the rider $f'$ on the plunger-rod so engaged by the dogging-bar $k$ engages the latch $o$ and throws it up out of the way into engagement with the catch $o'$. The catch $o'$ is carried at the lower end of a square rod $o^2$, sliding in brackets $o^3$ and pressed down by the coil-spring $o^4$. As the latch $o$ is thrown up it pushes up the catch $o'$ until it enters the groove $o^5$ in the catch.

Having now described the operation of filling all the shells of any single shuttle and the way in which all the plunger-rods and their corresponding tamps are rendered inoperative, I will now describe the undogging mechanism, whereby the plunger-rods are released and all the parts restored to their original position preparatory to packing another set of shells. This mechanism is thrown into action by the operator as soon as the shuttle of loaded shells is removed and a shuttle of empty shells substituted.

$l$ is a lever pivoted at one end to one of the uprights of the frame $a$. $l'$ is a cord secured to the other end of lever $l$, said cord passing over suitable pulleys $l^2$ and down within convenient reach of the operator.

$l^3$ is an arm secured to the lever $l$ and having a downwardly-inclined upper end.

Figure 1:
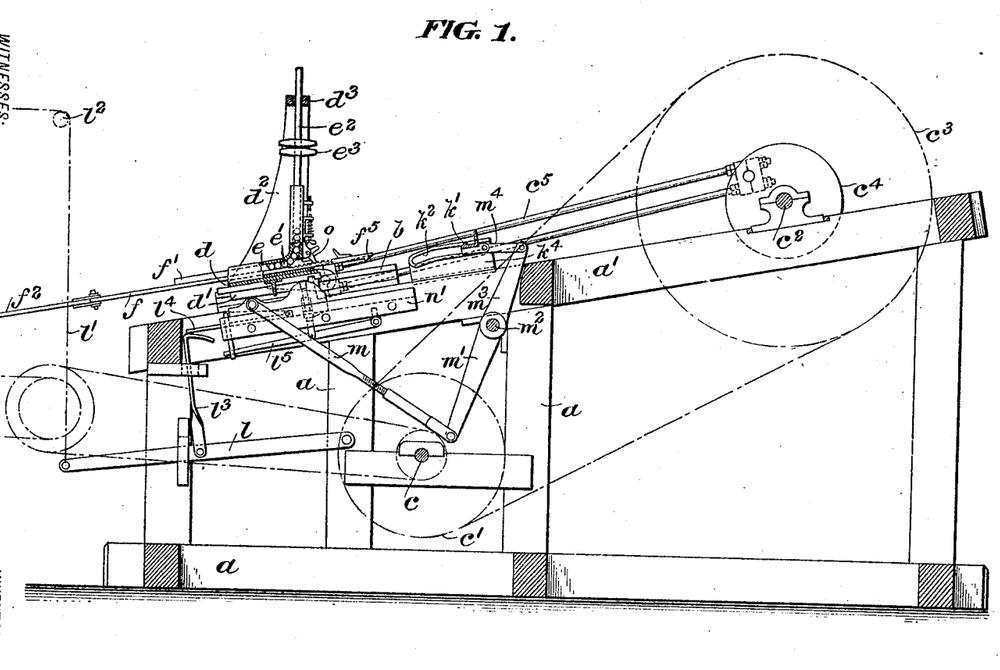
Figure 1A:
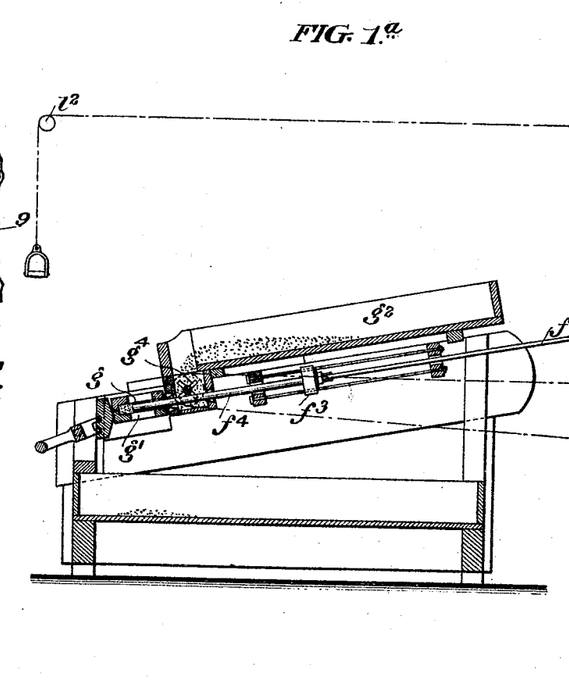
Figure 2:
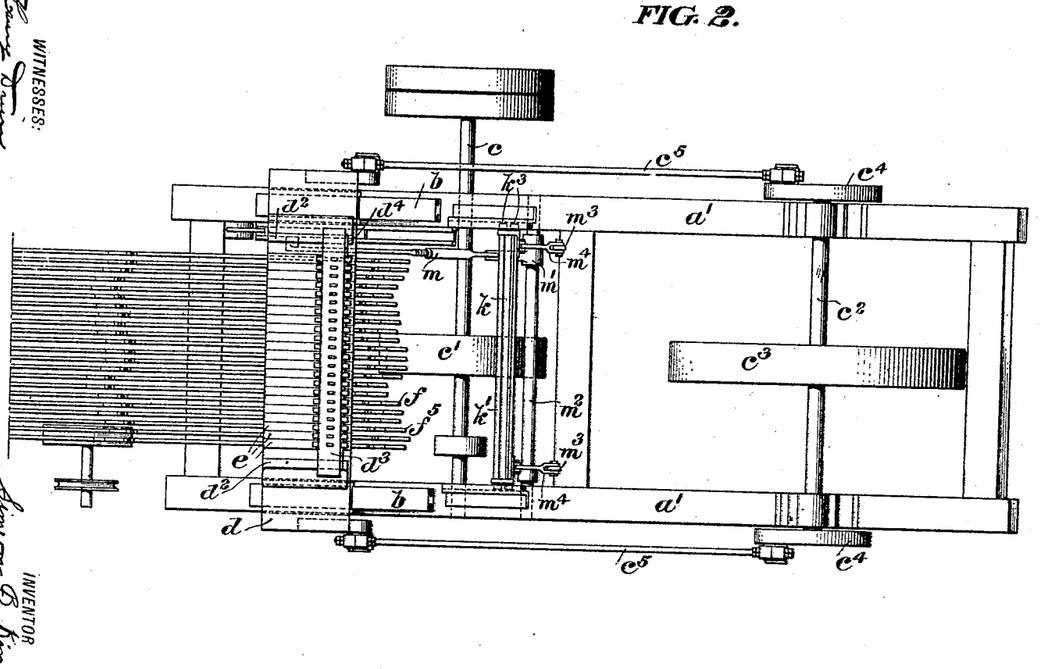
Figs. 2 and 2ª, a plan view of the machine.

$l^4$ is a lever pivoted on a sliding block $n$ (normally in the position shown in Fig. 1) and in alinement with and adapted to be raised by the arm $l^3$ when the lever $l$ is lifted by means of the cord $l'$.

$l^5$ is a lever pivoted at one end to the stationary guide $n'$ and connected at its other end by means of the plate connection $l^6$ with the lever $l^4$, whereby the lifting of lever $l^4$ also effects the lifting of lever $l^5$.

$l^7$ is a pin secured to the lever $l^5$.

Figures 3, 4, 5:
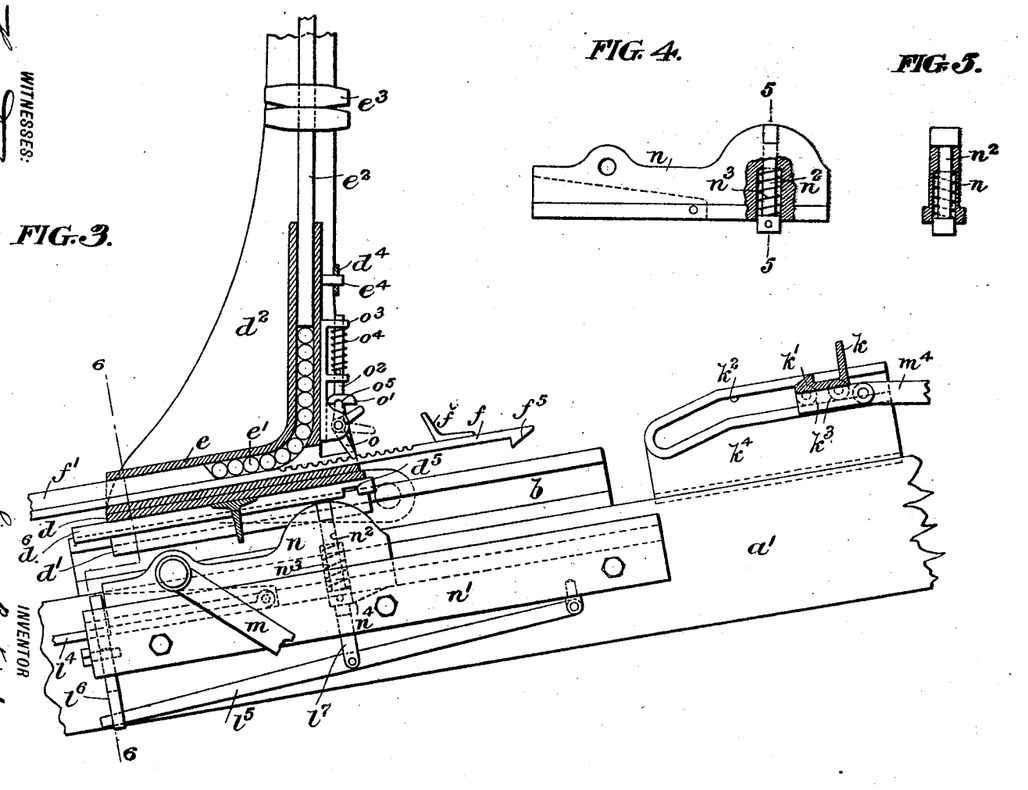
Fig. 3, an enlarged sectional elevation of a portion of the machine.
Fig. 4, a detailed side view of the sliding block.
Fig. 5, a section on line 5 5 of Fig. 4.

$n^2$ is a pin in the sliding block $n$. (See Figs. 4 and 5.) The pin $n^2$ has a square head which fits in a groove across the block $n$.

$n^3$ is a spring normally pressing the pin $n^2$ downwardly into the recess $n^4$ in the guide $n'$.

When the cord is manipulated, as before described, to lift the lever $l^5$, the pin $l^7$ engages the square end of pin $n^2$ and moves the pin upwardly. As the carriage $d$ reaches the forward end of its stroke the pin $n^2$ is projected into the jaw $d^5$, formed in the lower face of a piece $d^6$, secured to the carriage. On the back stroke of the carriage, therefore, the block $n$ moves with the carriage, sliding backwardly in the guide $n'$, the pin $n^2$ being held up by reason of its contact with the unrecessed part of guide $n'$.

$m$ is a reach-arm pinned to block $n$.

$m'$ is a lever secured at one end to the shaft $m^2$ and at the other end to the reach-arm $m$.

$m^3$ represents levers secured to the shaft $m^2$.

$m^4$ represents reach-arms pivoted to the ends of levers $m^3$.

The dogging-bar $k$ is secured between the reach-arms $m^4$. At either end of the dogging-bar are pivoted two rollers $k^3$, which fit into the groove $k^2$ of the stationary guide $k^4$, secured to the inclined beam $a'$. As the block $n$ moves back, as before described, the dogging-bar $k$ through the mechanism just described is moved forwardly, its rear wall pushing the plunger-rods $f$ forwardly, which causes the angle-bars $f^6$ on top of plunger-rods $f$ to knock down the latches $o$ into their normal position, the groove $o^5$ in the catch $o'$ being so formed that the latch is easily released therefrom. The groove $k^2$ of the guide $k^4$ dips downwardly at its forward end, so that as the dogging-bar $k$ completes its forward movement it is guided downwardly, so as to entirely release the plunger-rods $f$. On the next forward movement of the carriage $d$ the sliding block $n$ is returned to its normal position of rest, the spring $n^3$ projecting the square head of pin $n^2$ within the recess $n^4$, thereby disengaging the block $n$ from the carriage d. The dogging-bar k is also restored to its normal position. The operation of loading the shells now proceeds, as before described.

The machine is adapted to fill shells of different sizes, as the connection between the plunger-rods $f$ and tamps $f^4$ is sufficiently flexible to enable the tamps to be offset with respect to the plungers—that is, a tamp need not be connected to the plunger-rod immediately back of it; but it may be connected to one of the adjacent plunger-rods on either side of the one immediately back of it, the wooden rods $f^2$ being easily bent and capable of being set over two or three places without appreciable buckling. The number of roller-casings and plunger-rods should equal the maximum number of shells that are inserted in a shuttle. When such maximum number of shells are to be loaded, all the tamps are used, and each tamp is connected with the plunger-rod directly back of it. When larger shells are to be loaded and a shuttle containing a smaller number of shells consequently used, a corresponding number of tamps are employed and guides adapted to such tamps substituted for those shown, and some at least of the tamps will be connected with plunger-rods not directly back of it, although there will be no necessity of setting over any of the rods $f^2$ more than one place. The advantages of a machine that is capable of packing shells of any size are obvious.

Having now fully described my invention, what I claim, and desire to protect by Letters Patent, is—

1. In a machine for packing explosives in shells, the combination, with shell-supporting means and tamps adapted to enter the shells, of a reciprocating carriage having roller-channels, said channels being curved for at least a part of their length, weighted rollers in said channels, and means enabling the rollers to operate the tamps, the weighted rollers forcing the tamps forwardly with a yielding pressure, as the carriage moves forwardly, substantially as described.

2. In a machine for packing explosives in shells, the combination, with shell-supporting means and tamps, of a plunger connected with each tamp, a tension device for each plunger and acting at an angle thereto, a roller-case for each plunger, said roller-case having a continuous channel curved for at least a part of its length, rollers in said channel acting upon said plunger and acted upon by said tension device, and means to reciprocate the roller-cases.

3. In a machine for packing explosives in shells, the combination, with shell-supporting means and tamps, of roller-cases each having a continuous channel, a portion of which is vertical, while another portion extends at an angle to the vertical, rollers adapted to traverse the channel, presser-rods entering the vertical portions of the channels, plungers connected with the tamps, entering the other portions of the channels, each set of rollers being thus confined between a presser-rod and a plunger, and means to reciprocate the roller-cases, thereby causing the tamps to enter the shells and pack the explosive therein with a yielding pressure, substantially as described.

4. In a machine for packing explosive shells, the combination, with shell-supporting means and tamps, of a carriage, means to reciprocate the carriage, roller-cases supported on the carriage, each roller-case having a continuous channel a portion of which is vertical while another portion extends toward the shell-supporting means, rollers within the channel and adapted to move back and forth therein, presser-rods entering the vertical portions of the channels and engaging the rollers therein, plungers entering the other portions of the channels and engaging the rollers therein, and rods connecting the plungers with the tamps, substantially as described.

5. In a machine for packing explosives in shells, the combination, with shell-supporting means and tamps adapted to enter the shells, of reciprocating means to project the tamps into the shells including yielding pressure devices adapted to permit the tamps to be retracted by the explosive packed thereby, and locks adapted to hold the tamps in their retracted position after each loading action of the tamps, substantially as described.

6. In a machine for packing explosives in shells, the combination with shell-supporting means and tamps adapted to enter the shells, of reciprocating means to project the tamps into the shells including yielding pressure devices adapted to permit the tamps to be retracted by the explosive packed thereby, a lock adapted to hold each tamp in its retracted position after each loading action, a lock adapted to hold each tamp out of operation after the loading of its corresponding shell is completed, and means to unlock the tamps.

7. In a machine for packing explosives in shells, the combination, with shell-supporting means and tamps adapted to enter the shells, of a carriage, yielding pressure devices supported on the carriage but capable of independent movement relative thereto, connecting means between said yielding pressure devices and the tamps, means to reciprocate the carriage thereby projecting the tamps into the shell with a yielding pressure and causing the explosive packed therein to retract the tamps relatively to the carriage, and locks adapted to hold the tamps in their retracted positions after each loading action of the tamps, substantially as described.

8. In a machine for packing explosives in shells, the combination, with shell-supporting means and tamps, of a plunger connected with each tamp, a tension device for each plunger and acting at an angle thereto, roller-cases for the plungers, said roller-cases having continuous channels curved for at least a part of their length, riders secured to and forming part of the plungers and extending within the portion of the roller-channels adjacent to the plungers, and rollers in the channels engaging said riders.

9. In a machine for packing explosives in shells, the combination, with shell-supporting means and tamps, of a plunger connected with each tamp, a tension device for each plunger and acting at an angle thereto, roller-cases for the plungers, said roller-cases having continuous channels curved for at least a part of their length, riders secured to and forming part of the plungers and extending within the portion of the roller-channels adjacent to the plungers, rollers in the channels engaging said riders, locks adapted when in operative position to engage and hold the plungers in their retracted position after each loading action of the tamps, said locks being in line of travel of said riders and adapted to be engaged by said riders when the plungers are retracted to a determinate extent and move said locks into inoperative position.

10. In a machine for packing explosives in shells, the combination, with shell-supporting means, tamps and plungers connected with the tamps, of a reciprocating carriage, yielding pressure devices supported on the carriage but capable of independent movement relative thereto and adapted to actuate the plungers as the carriage moves forwardly, a lock for each plunger adapted to hold the plunger in its retracted position after each loading action, and a lock adapted to engage each plunger when the latter is moved to its extreme retracted position after the loading of the shell is completed and hold said plunger out of operation during the subsequent reciprocations of the carriage, substantially as described.

11. In a machine for packing explosives in shells, the combination with shell-supporting means and tamps, of plungers connected with the tamps, rollers, roller-cases, each having a channel for the reception of the rollers and an orifice through which said plunger extends, said plunger also extending within the roller-channel and engaged by said rollers, tension devices engaging the rollers in the channels and causing them to press against the plungers, and means to reciprocate the roller-cases thereby causing the tamps to enter the shells and, together with the plungers, to be retracted relatively to the roller-cases, a lock adapted to hold the plungers in their retracted positions after each loading action of the tamps, and a dogging-bar adapted to engage and hold each plunger out of operation after the loading of its corresponding shell is completed, substantially as described.

12. In a machine for packing explosives in shells, the combination, with shell-supporting means, tamps and plungers connected with the tamps, of a reciprocating carriage, yielding pressure devices supported on the carriage but capable of independent movement relative thereto and adapted to actuate the plungers as the carriage moves forwardly, a lock for each plunger adapted to hold the plunger in its retracted position after each loading action, a lock adapted to engage each plunger when the latter is moved to its extreme retracted position after the loading of the shell is completed and hold said plunger out of operation during the subsequent reciprocations of the carriage, and unlocking means on each plunger adapted to disengage the first-named lock from the plunger when the plunger's engagement with the last-named lock is effected, substantially as described.

13. In a machine for packing explosives in shells, the combination, with shell-supporting means, tamps, plungers connected with the tamps, of a carriage, means to reciprocate the carriage, roller-cases supported on the carriage, each roller-case having an orifice through which the plunger extends, and also a roller-channel, rollers within the channel, tension devices engaging said rollers, a rider secured to and forming part of each plunger and extending within the roller-channel, the upper face of the plunger being transversely grooved, a latch adapted to engage each plunger and hold it from moving forwardly relative to the carriage after it is retracted at the end of each loading action, a dogging-bar adapted to engage and hold each plunger out of operation after its loading operation is completed, said rider being arranged to disengage said latch from the plunger when the latter's engagement with the dogging-bar is effected, and a spring-pressed catch adapted to hold the disengaged latch out of operation, substantially as described.

14. In a machine for packing explosives in shells, the combination, with shell-supporting means, tamps, and plungers connected with the tamps, a reciprocating carriage, yielding pressure devices on the carriage adapted to actuate the plungers as the carriage moves forwardly, a lock adapted to hold each plunger out of operation when the loading of its corresponding shell is completed, a normally stationary sliding block, connections therefrom to the lock, and means to operatively engage said block with the carriage, thereby sliding said block and operating the lock to unlock all the plungers, substantially as described.

15. In a machine for packing explosives in shells, the combination, with shell-supporting means and tamps, of a reciprocating carriage, yielding pressure devices on the carriage adapted to actuate the tamps, a lock adapted to hold each tamp out of operation when the loading of its corresponding shell is completed, a normally stationary sliding block, connections therefrom to the lock, a pin on said block adapted to engage said carriage, a spring normally holding said pin out of engagement with said carriage, and means to move the pin into engagement with the carriage, thereby causing the latter to actuate the block and operate the lock to unlock all the tamps, substantially as described.

16. In a machine for packing explosives in shells, the combination, with shell-supporting means and tamps, of a reciprocating carriage, yielding pressure devices on the carriage adapted to actuate the tamps, a lock adapted to hold each tamp out of operation when the loading of its corresponding shell is completed, a normally stationary sliding block, connections therefrom to the lock adapted when operated to move the lock into position to unlock all the tamps, a guide in which said block slides, a pin on said block adapted to engage said carriage, a spring normally holding said pin out of engagement with said carriage and into engagement with a recess in said guide, and means to move the pin out of engagement with the guide and into engagement with the carriage, thereby causing the block to move with the carriage and operating the connections to the lock, substantially as described.

17. In a machine for packing explosives in shells, the combination, with shell-supporting means and tamps, of a reciprocating carriage, yielding pressure devices on the carriage adapted to actuate the tamps, a lock adapted to hold each tamp out of operation when the loading of its corresponding shell is completed, a normally stationary sliding block, connections therefrom to the lock, a lever, means for moving the same, an arm secured to said lever, a second lever pivoted on the block and adapted to be operated by said arm when the first lever is operated, a stationary guide in which said block slides, a third lever pivoted thereon, a connection therefrom to the second lever whereby the second lever operates the third lever, and means actuated by the third lever to cause said block to engage with said carriage, whereby the carriage, through the block and connections, operates the lock to unlock all the tamps, substantially as described.

18. In a machine for packing explosives in shells, the combination, with shell-supporting means and tamps, of a reciprocating carriage, yielding pressure devices on the carriage adapted to actuate the tamps, a lock adapted to hold each tamp out of operation when the loading of its corresponding shell is completed, a normally stationary sliding block, connections therefrom to the lock adapted when operated to move the lock into position to unlock all the tamps, a guide in which said block slides, a pin on said block adapted to engage said carriage, a spring normally holding said pin out of engagement with said carriage and into engagement with a recess in said guide, a lever, means for moving the same, an arm on said lever, a second lever pivoted to the block and adapted to be operated by said arm, a third lever pivoted on the guide, a connection from the second lever to the third lever, and a pin on the third lever adapted to engage the pin in the block and move it out of engagement with the guide and into engagement with the carriage, substantially as described.

19. In a machine for packing explosives in shells, the combination, with shell-supporting means, tamps and plungers connected with the tamps, of a reciprocating carriage, yielding pressure devices on the carriage adapted to actuate the plungers as the carriage moves forwardly, a dogging-bar adapted to engage and hold each plunger out of operation when the loading of its corresponding shell is completed, a guide along which said dogging-bar is adapted to move out of locking position, and means to move said dogging-bar along the guide, thereby unlocking all the plungers, substantially as described.

20. In a machine for packing explosives in shells, the combination, with shell-supporting means, tamps and plungers connected with the tamps, of a reciprocating carriage, yielding pressure devices on the carriage adapted to actuate the plungers as the carriage moves forwardly, and normally stationary means engaging and holding each plunger out of operation when the loading of its corresponding shell is completed and movable to unlock the plungers and return them to operative position, substantially as described.

21. In a machine for packing explosives in shells, the combination, with shell-supporting means, tamps and plungers, having hooked rear ends, connected at their forward ends with the tamps, of a reciprocating carriage, yielding pressure devices adapted to actuate the plungers as the carriage moves forwardly, a dogging-bar having a lip with which the hooked rear end of each plunger engages when the loading of its corresponding shell is completed and a rear wall, and means to move said dogging-bar forwardly and downwardly, thereby simultaneously unlocking said plungers and pushing them into their initial operative positions, substantially as described.

22. In a machine for packing explosives in shells, the combination, with shell-supporting means, tamps and plungers having hooked rear ends, connected at their forward ends with the tamps, of a reciprocating carriage, yielding pressure devices adapted to actuate the plungers as the carriage moves forwardly, a guide having grooves extending generally in the direction of extension of the plungers but whose forward end dips downwardly, a dogging-bar, rollers thereon slidable in said grooves, said dogging-bar having a lip with which the hooked rear end of each plunger engages when the loading of its corresponding shell is completed and a rear wall, and means to move said dogging-bar forwardly, thereby restoring the plungers to their operative position and unlocking them, substantially as described.

23. In a machine for packing explosives in shells, the combination, with shell-supporting means, tamps and plungers connected with the tamps, of a reciprocating carriage, yielding pressure devices supported on the carriage and adapted to actuate the plungers as the carriage moves forward, a lock for each plunger adapted to hold the plunger in its retracted position after each loading action, a lock adapted to engage each plunger when the latter is moved to its extreme retracted position after the loading of the shell is completed and hold said plunger out of operation during the subsequent reciprocation of the carriage, unlocking means to disengage the first-named lock from the plunger when the plunger's engagement with the last-named lock is effected, and means to disengage the last-named lock from, and reëngage the first-named lock with, all the plungers, substantially as described.

24. In a machine for packing explosives in shells, the combination, with shell-supporting means, tamps, plungers connected with the tamps, of a carriage, means to reciprocate the carriage, roller-cases supported on the carriage, each roller-case having an orifice through which the plunger extends and also a roller-channel, rollers within the channel, tension devices engaging said rollers, a rider secured to and forming part of each plunger and extending within the roller-channel, the upper face of the plunger being transversely grooved, a latch adapted to engage each plunger and hold it from moving forwardly relative to the carriage after it is retracted at the end of each loading action, a normally stationary dogging-bar adapted to engage and hold each plunger out of operation after its loading operation is completed, said rider being adapted to disengage said latch from the plunger when the latter's engagement with the dogging-bar is effected, a catch adapted to hold the disengaged latch out of operation, means to move the dogging-bar forwardly and downwardly, thereby undogging all the plungers and restoring them to their initial operative position, and a device on each plunger adapted, in the forward movement of the plunger, to disengage the latch from the clutch, substantially as described.

25. In a machine for packing explosives in shells, the combination, with shell-supporting means and tamps adapted to enter the shells, of plungers, means to reciprocate the plungers, and intermediate rods between the plungers and tamps, each of which is movable to connect one of the tamps with one of a plurality of plungers, whereby shells of different sizes may be loaded, substantially as described.

26. In a machine for packing explosives in shells, the combination with shell-supporting means and tamps adapted to enter the shells, of a carriage and operating means therefor, yielding pressure devices supported on the carriage but capable of independent movement relative thereto, plungers actuated by the yielding pressure devices, and flexible rods each of which is adapted to connect one of the tamps with one of a plurality of plungers.

27. In a machine for packing explosives in shells, the combination of the tamps, the plungers and the flexible rods attached to the front ends of the plungers and jointed to the rear ends of the tamps, substantially as described.

28. In a machine for packing explosives in shells, the combination, with plungers, means to reciprocate the plungers, and tamp-actuating rods connected with the plungers and movable to connect with tamps more or less offset with relation to the plungers.

29. In a machine for packing explosives in shells, the combination, with plungers, means to reciprocate the plungers, and tamp-actuating rods connected with the plungers, said rods having a limited flexibility whereby they may be connected with tamps spaced at different distances apart and some or all of which are more or less offset with relation to the plungers.

30. In a machine for packing explosives in shells, the reciprocating roller-cases, each of which contains a channel having a vertical end portion, an end portion at an angle to the vertical portion and a curved portion connecting the end portions, rollers movable in the channel, weighted presser-rods inserted in the vertical portion of the channel and bearing upon the rollers, tamp-actuating plungers extending into the other end portion of the channel, and tamps connected with the plungers, whereby the tamps when in action are each at all times subjected to a uniform pressure, substantially as described.

31. In a machine for packing explosives in shells, the L-shaped dogging-bar having a lip at the forward end of one member, combined with the independently-actuated plungers having hooked rear ends, whereby the dogging-bar, when stationary, holds the plungers inoperative when the latter are retracted, means for moving the dogging-bar forwardly thereby causing the other member of the dogging-bar to push said plungers into operative position, and a forwardly-extending guide having a downwardly-extending front end which, in its forward movement, the dogging-bar engages and which determines the direction of movement of the dogging-bar when the latter is actuated, substantially as described.

32. In a machine for packing explosives in shells, in combination, the reciprocating plungers, yielding pressure devices engaging the plungers, means for moving the yielding pressure devices forwardly thereby actuating the plungers, a latch normally adapted to engage the plunger and lock it from moving forwardly, relatively to the yielding pressure devices, a locking member on each plunger, a dogging-bar common to all the plungers and adapted to engage the locking members thereof when the same has been retracted and hold the plungers inoperative, a rider on each plunger adapted when the plunger has been retracted to disengage the latch from the plunger, and a latch-unlocking device on each plunger adapted, when the plunger is restored to its operative position, to restore the latch to its normal position.

33. In a machine for packing explosives in shells, in combination, the reciprocating plungers, a rider on each plunger, yielding pressure devices engaging the rider, means for moving the yielding pressure devices forwardly thereby through the riders actuating the plungers, a latch normally adapted to engage the plunger and lock it from moving forwardly relatively to the yielding pressure devices but adapted to be disengaged from the plunger by the rider when the plunger is retracted a determinate distance, a catch adapted to engage the disengaged latch, and an unlocking device on each plunger adapted when the plunger is moved forwardly from its retracted position to disengage the latch from the catch.

34. In a machine for packing explosives in shells, in combination, the reciprocating plungers, a rider on each plunger, yielding pressure devices engaging the rider, means for moving the yielding pressure devices forwardly thereby through the riders actuating the plungers, a latch normally adapted to engage the plunger and lock it from moving forwardly relatively to the yielding pressure devices but adapted to be disengaged from the plunger by the rider when the plunger is retracted a determinate distance, a dogging-bar adapted to successively hold all the retracted plungers inoperative and also move them forwardly into operative position, means to actuate the dogging-bar, a catch adapted to engage the disengaged latch, and an unlocking device on each plunger adapted when the plunger is moved forwardly from its retracted position to disengage the latch from the catch.

35. In a machine for packing explosives in shells, the reciprocating carriage and plungers carried thereby, combined with a lock adapted when stationary to lock all the plungers out of action and when moved to unlock all the plungers, a sliding block normally stationary, connections from the block to the lock, and manually-controlled means to engage the block with the carriage, thereby moving the block and lock, substantially as described.

36. In a machine for packing explosives in shells, the combination with the tamps and the plungers connected thereto, of a carriage and reciprocating means therefor, independent yielding pressure devices actuating each plunger and reciprocated by the carriage, a lock holding each plunger from moving forwardly with relation to the carriage after each loading action, means to lock all the plungers from operating when moved backwardly to a determinate distance and means to restore all the plungers to their initial operative position, substantially as described.

37. In a machine for packing explosives in shells, the combination with the tamps and the plungers connected thereto, of a carriage and reciprocating means therefor, independent yielding pressure devices actuating each plunger and reciprocated by the carriage, a lock holding each plunger from moving forwardly, a dogging-bar adapted to engage and hold each plunger out of operation when said plunger is moved backwardly to a determinate distance, a sliding block normally stationary and out of engagement with the carriage and connected with the lock so as to disengage the same from the plungers when the block is operated, and manually-controlled means to engage the block with the carriage, thereby operating the block, substantially as described.

In testimony of which invention I have hereunto set my hand, at Marquette, Michigan, on this 30th day of September, 1904.

SIMEON BURRITT KIMBER.

Witnesses:
SAML. E. BYRNE,
J. G. REYNOLDS,
GREEN K. HARPER.